(12) United States Patent
Zimbelman

(10) Patent No.: US 11,185,179 B2
(45) Date of Patent: Nov. 30, 2021

(54) LIQUID CONSUMPTION MONITORING DEVICE

(71) Applicant: Briana Zimbelman, Lakeway, TX (US)

(72) Inventor: Briana Zimbelman, Lakeway, TX (US)

( * ) Notice: Subject to any disclaimer, the term of this patent is extended or adjusted under 35 U.S.C. 154(b) by 0 days.

(21) Appl. No.: 16/854,599

(22) Filed: Apr. 21, 2020

(65) Prior Publication Data

US 2021/0321803 A1 Oct. 21, 2021

(51) Int. Cl.
*A47G 19/22* (2006.01)
*G01F 1/00* (2006.01)

(52) U.S. Cl.
CPC ......... *A47G 19/2227* (2013.01); *G01F 1/007* (2013.01); *A47G 2200/00* (2013.01)

(58) Field of Classification Search
CPC ............... A47G 19/2227; A47G 23/16; A47G 2019/2238; A47G 2019/2244; A47G 2200/00; G01F 1/007
See application file for complete search history.

(56) References Cited

U.S. PATENT DOCUMENTS

| | | | |
|---|---|---|---|
| 5,540,611 A | 7/1996 | Lapoint | |
| 5,842,901 A | 12/1998 | Montgomery | |
| 5,897,013 A * | 4/1999 | Manganiello | A47G 19/2266 220/252 |
| 6,652,346 B1 | 11/2003 | Arnold, III | |
| 6,743,071 B1 | 6/2004 | Tronca | |
| 7,845,506 B2 * | 12/2010 | Willows | B65D 25/22 215/382 |
| 8,378,830 B2 * | 2/2013 | Moran | G01F 15/0755 340/573.1 |
| D707,492 S | 6/2014 | George | |
| 9,380,897 B2 * | 7/2016 | Pfeiffer | G01F 23/00 |
| 10,188,230 B2 * | 1/2019 | Hambrock | A47G 23/16 |
| 10,568,448 B2 * | 2/2020 | Lavi | H04Q 9/00 |
| 10,676,251 B2 * | 6/2020 | Krafft | B65D 43/26 |
| 2002/0139767 A1 * | 10/2002 | Budd | A47G 19/2272 215/387 |
| 2009/0321458 A1 * | 12/2009 | Blair | A47G 19/2227 220/709 |
| 2012/0094261 A1 * | 4/2012 | Hayn | G01F 15/063 434/247 |
| 2013/0275075 A1 * | 10/2013 | Johnson | A45F 3/16 702/127 |
| 2020/0022519 A1 * | 1/2020 | Mebberson | B65D 47/06 |
| 2020/0029714 A1 * | 1/2020 | Nguyen | A47G 23/16 |

FOREIGN PATENT DOCUMENTS

WO WO2018023370 8/2018

* cited by examiner

*Primary Examiner* — Justin N Olamit

(57) ABSTRACT

A liquid consumption monitoring device for monitoring and encouraging consumption of a liquid includes a cup and a lid, which is selectively engageable to the cup to close a top thereof. The user is positioned to tilt the cup to dispense a liquid from the cup, through an opening positioned in the lid, into a mouth of the user. A flow meter engaged to the cup, proximate to the opening, measures a volume of the liquid passing through the opening. An interface is engaged to at least one of the cup and the lid and is operationally engaged to the flow meter. The interface receives a signal from the flow meter when the liquid passes through the opening. The interface selectively actuates at least one of a speaker and a bulb, upon receipt of the signal from the flow meter, to provide a sensory reward to the user.

15 Claims, 4 Drawing Sheets

LIQUID CONSUMPTION MONITORING DEVICE

CROSS-REFERENCE TO RELATED APPLICATIONS

Not Applicable

Statement Regarding Federally Sponsored Research or Development

Not Applicable

The Names of the Parties to a Joint Research Agreement

Not Applicable

Incorporation-by-Reference of Material Submitted on a Compact Disc or as a Text File Via the Office Electronic Filing System Not Applicable Statement Regarding Prior Disclosures by the Inventor or Joint Inventor Not Applicable

BACKGROUND OF THE INVENTION

(1) Field of the Invention

The disclosure relates to consumption monitoring devices and more particularly pertains to a new consumption monitoring device for monitoring and encouraging consumption of a liquid.

(2) Description of Related Art Including Information Disclosed Under 37 CFR 1.97 and 1.98

The prior art relates to consumption monitoring device. Prior art consumption monitoring device may comprise a cap for a cup having an inclinometer engaged thereto, a device selectively and sequentially engageable to bottles to track a number of bottles consumed, and a cup having a weight sensor engaged thereto.

BRIEF SUMMARY OF THE INVENTION

An embodiment of the disclosure meets the needs presented above by generally comprising a cup and a lid. The cup is configured to position a liquid, such as water, juice, or other beverage. The lid, which has an opening positioned therein, is selectively engageable to the cup to close a top thereof. A rim of the lid proximate to the opening is configured to be positioned on a lower lip of a user. The user is positioned to tilt the cup to dispense the liquid from the cup through the opening into a mouth of the user. A flow meter is engaged to the cup proximate to the opening and is configured to measure a volume of the liquid passing through the opening. An interface is engaged to at least one of the cup and the lid and is operationally engaged to the flow meter. The interface is positioned to receive a signal from the flow meter when the liquid passes through the opening. The interface comprises at least one of a speaker and a bulb and is configured to selectively actuate the at least one of the speaker and the bulb, upon receipt of the signal from the flow meter, to provide a sensory reward to the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
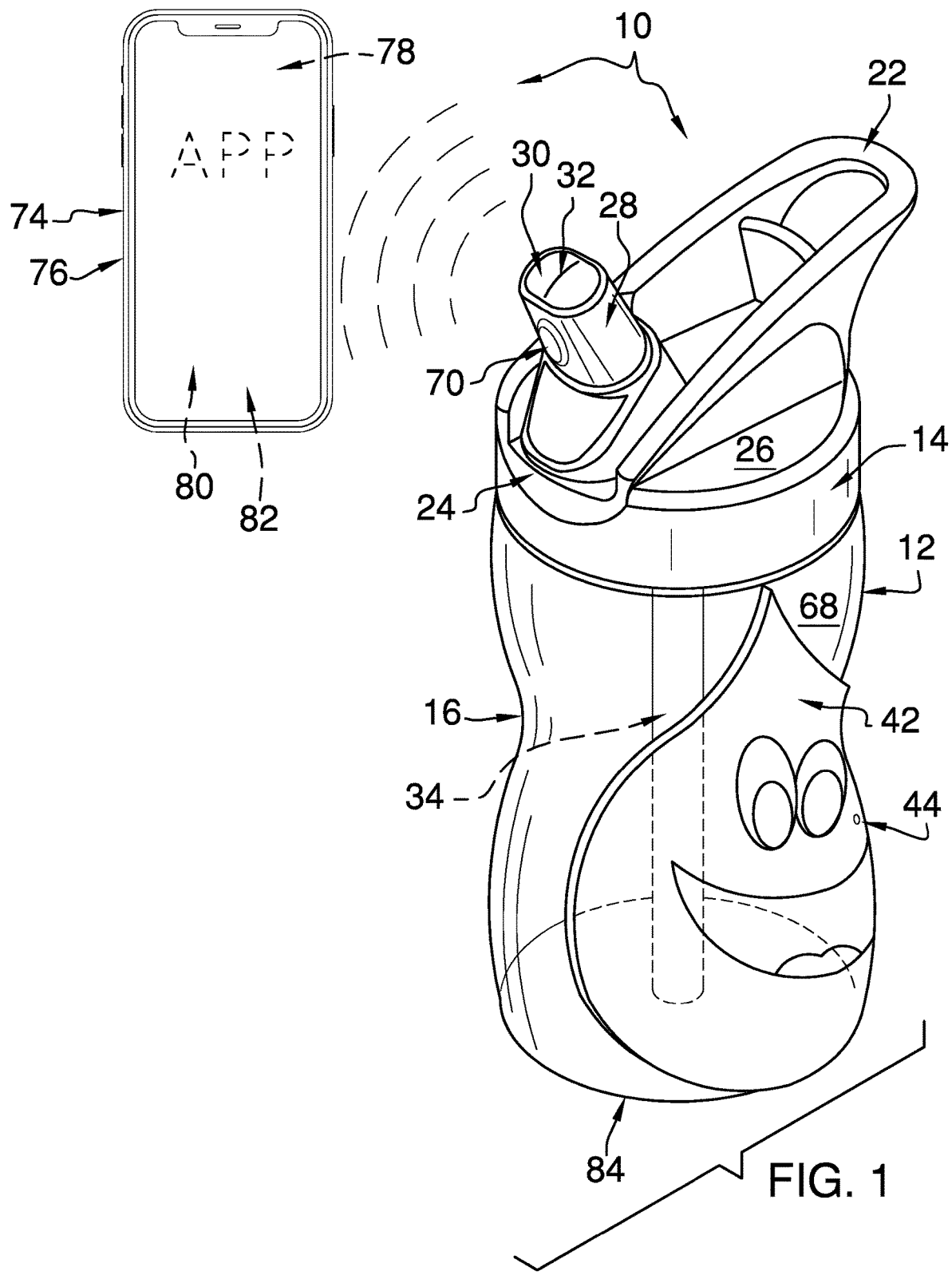
FIG. 1 is an isometric perspective view of a liquid consumption monitoring device according to an embodiment of the disclosure.

With reference now to the drawings, and in particular to FIGS. 1 through 4 thereof, a new consumption monitoring device embodying the principles and concepts of an embodiment of the disclosure and generally designated by the reference numeral 10 will be described.

Figure 2:
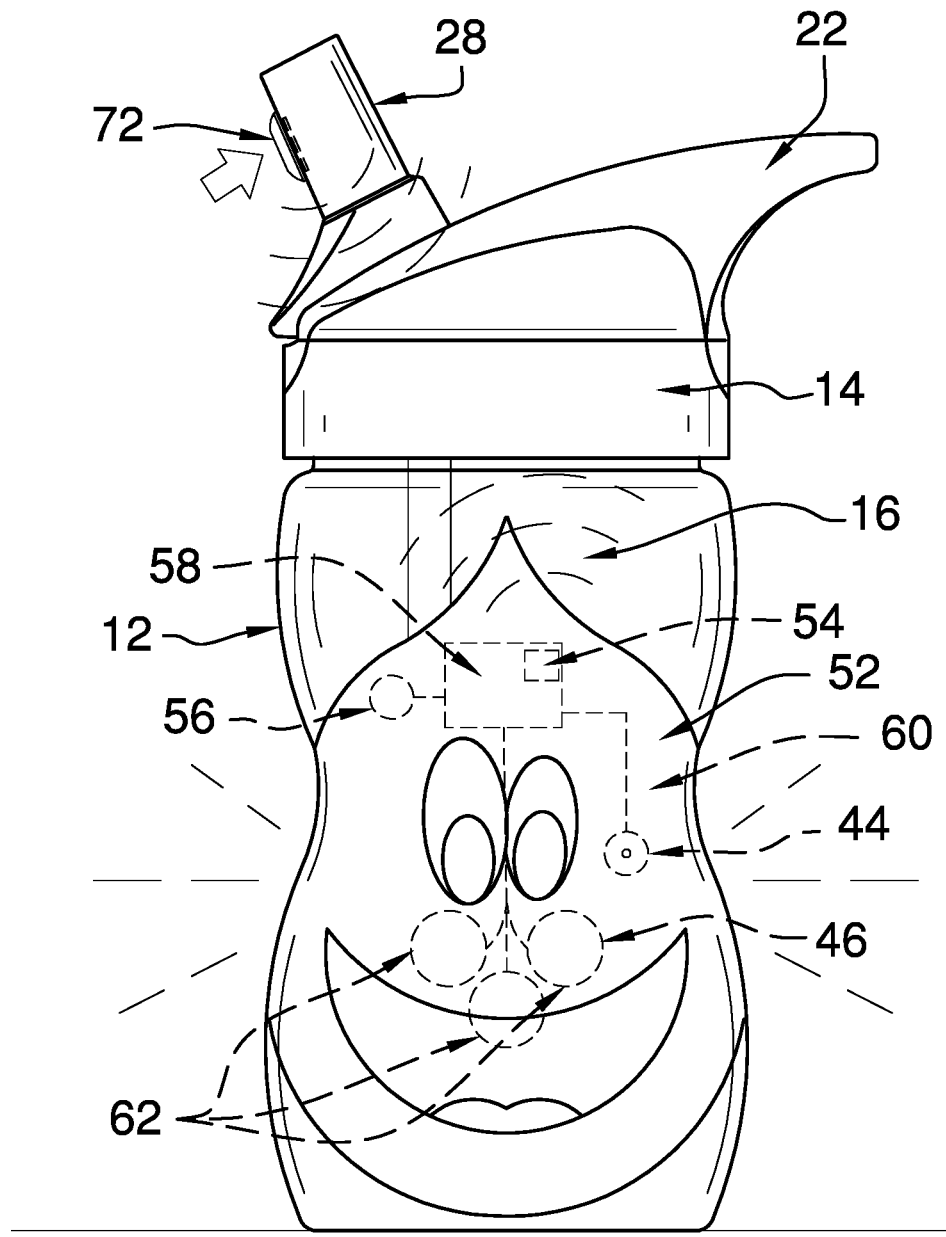
FIG. 2 is a side view of an embodiment of the disclosure.

As best illustrated in FIGS. 1 through 4, the liquid consumption monitoring device 10 generally comprises a cup 12 and a lid 14. The cup 12 may be substantially hourglass shaped when viewed from a side 16 thereof, as shown in FIG. 2, facilitating holding of the cup 12 in a hand of a user, particularly a child. The cup 12 is configured to position a liquid, such as water, juice, or another beverage.

Figure 4:
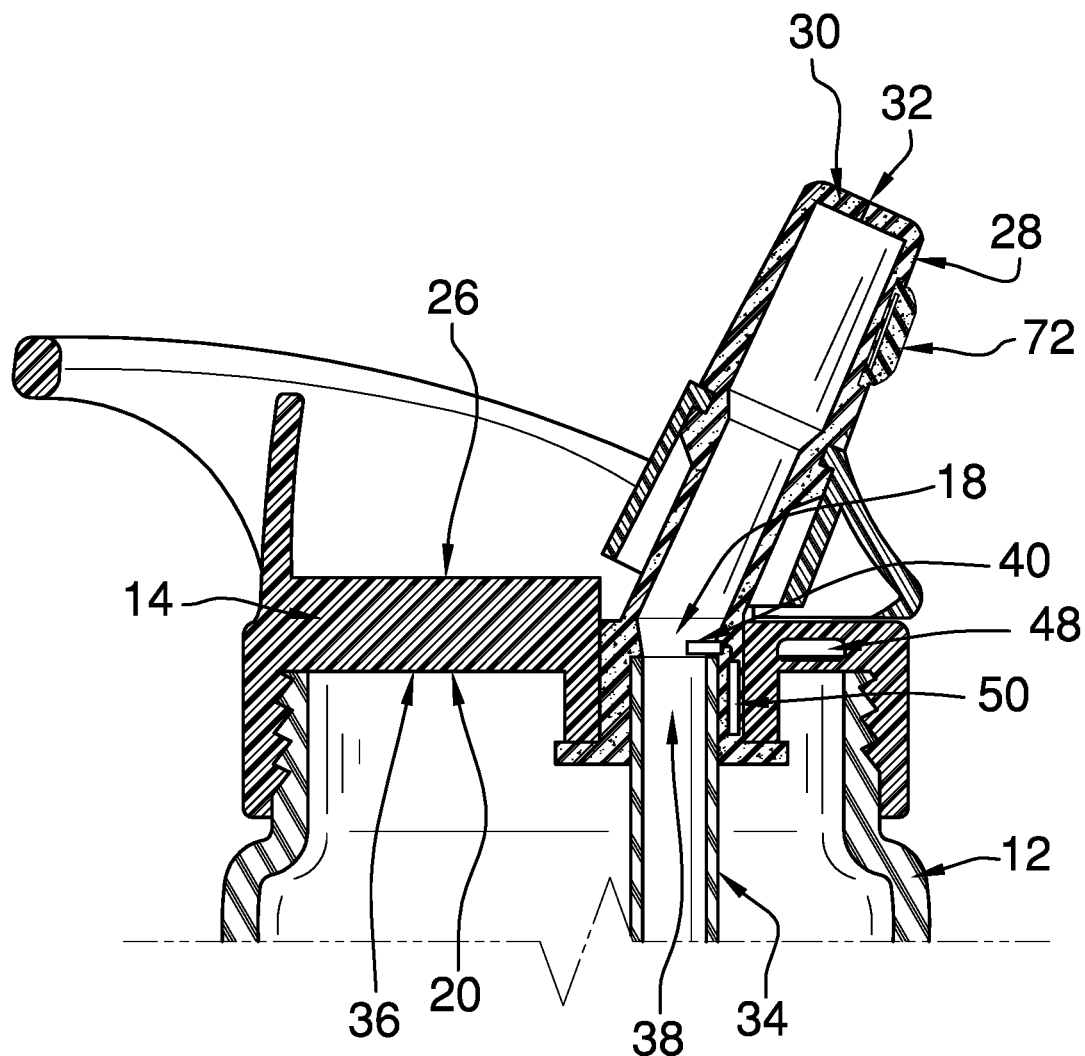
FIG. 4 is a cross-sectional view of an embodiment of the disclosure.

The lid 14, which has an opening 18 positioned therein, is selectively engageable to the cup 12 to close a top 20 thereof. The lid 14 may be threadedly engageable to the cup 12, as shown in FIG. 4. The present invention also anticipates the lid 14 being couplable to the cup 12 by other means, such as, but not limited to, flip top lids, frictionally couplable (snap-in and snap-over) lids, and the like. A ring 22 may be engaged to the lid 14 and extend therefrom. The ring 22 is configured for insertion of a digit of the hand of the user, allowing the user to lift and to carry the lid 14, the cup 12, and contents thereof.

A rim 24 of the lid 14 proximate to the opening 18 is configured to be positioned on a lower lip of the user. The user is positioned to tilt the cup 12 to dispense the liquid from the cup 12 through the opening 18 into a mouth of the user.

An upper face 26 of the lid 14 may have a pipe 28 engaged thereto and which extends from the opening 18. The pipe 28 is configured to position in the mouth of the user. The user is positioned to tilt the cup 12 to dispense the liquid from the cup 12 through the pipe 28 into the mouth.

A diaphragm 30 is engaged to the pipe 28 distal from the lid 14 to close the pipe 28. The diaphragm 30 is resiliently flexible and has a slit 32 positioned therein. The slit 32 is configured to separate upon application of suction to the pipe 28 applied by the mouth of the user. The liquid passes from the cup 12 through the pipe 28 and the slit 32 into the mouth of the user. The diaphragm 30 is configured to minimize leakage of the liquid through the pipe 28 should the cup 12 be tipped without application of suction to the pipe 28. The diaphragm 30 comprises at least one of rubber, silicone, and elastomer.

Figure 3:
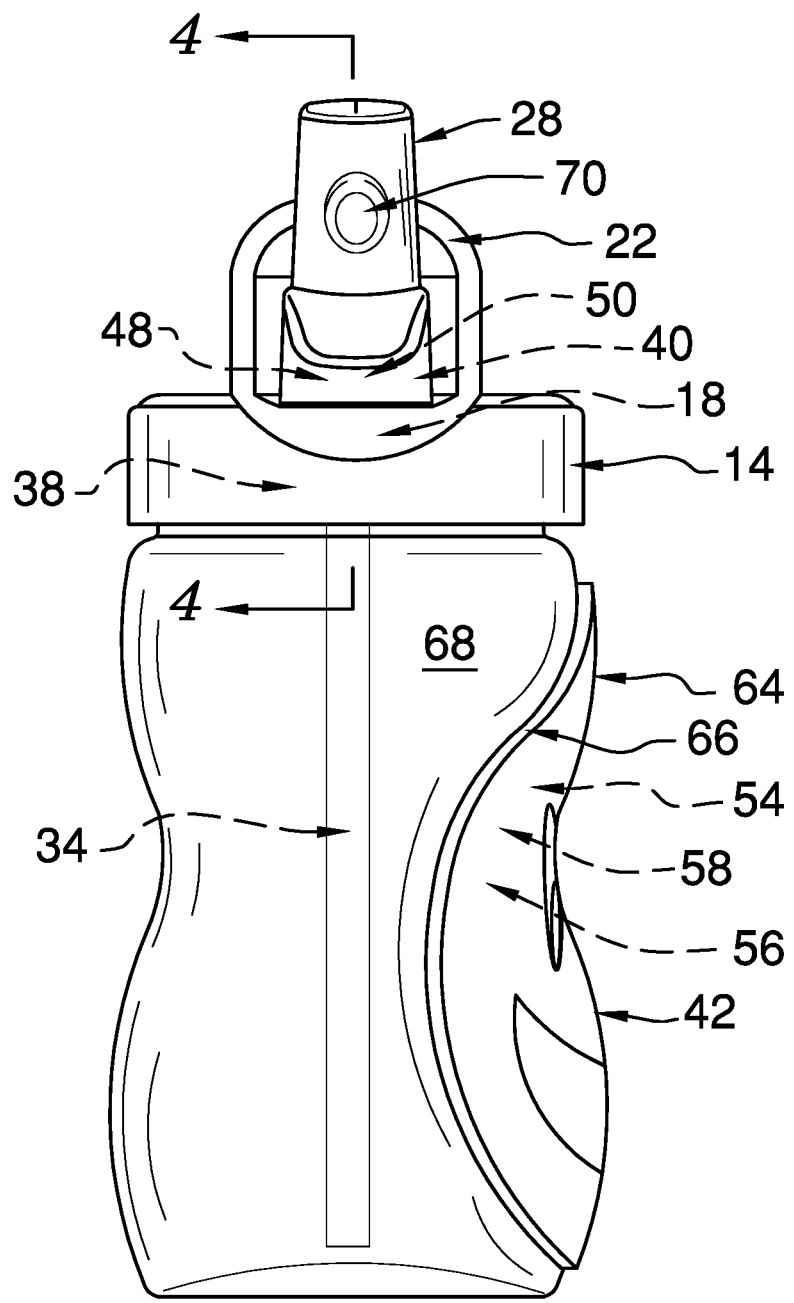
FIG. 3 is a front view of an embodiment of the disclosure.

A straw 34 is engaged to a lower face 36 of the lid 14 and extends from the opening 18 to proximate to a bottom 84 of the cup 12, as shown in FIG. 3. The pipe 28 is configured to position in the mouth of a user, enabling the user to suction the liquid from the cup 12, through the straw 34 and the pipe 28, into the mouth of the user.

The lower face 36 of the lid 14 has a recess 38 extending thereinto, which is complementary to the straw 34 as shown in FIG. 4. The recess 38 is positioned for selective insertion of the straw 34 to frictionally engage the straw 34 to the lid 14. The straw 34 being removably insertable into the recess 38 allows it to be removed for cleaning.

A flow meter 40 is engaged to the cup 12 proximate to the opening 18, as shown in FIG. 4, and is configured to measure a volume of the liquid passing through the opening 18. An interface 42 is engaged to at least one of the cup 12 and the lid 14 and is operationally engaged to the flow meter 40. The interface 42 is positioned to receive a signal from the flow meter 40 when the liquid passes through the opening 18. The interface 42 comprises at least one of a speaker 44 and a bulb 46 and is configured to selectively actuate the at least one of the speaker 44 and the bulb 46, upon receipt of the signal from the flow meter 40, to provide a sensory reward or encouragement to the user. The device 10 is anticipated to be useful in promoting proper hydration.

A first battery 48 is engaged to the lid 14 is operationally engaged to the flow meter 40. A transmitter 50 is engaged to the lid 14 and is operationally engaged to the flow meter 40 and the first battery 48.

The interface 42 comprises a housing 52, which is one embodiment is engaged to the cup 12. A receiver 54, a second battery 56, and a microprocessor 58 are coupled to the housing 52 and are positioned in an interior space 60 defined by the housing 52. The bulb 46 comprises a plurality of light emitting diodes 62, which is engaged to the housing 52 along with the speaker 44. The microprocessor 58 is operationally engaged to the plurality of light emitting diodes 62, the speaker 44, and the receiver 54. The transmitter 50 is positioned to communicate the signal from the flow meter 40 to the microprocessor 58 via the receiver 54. The microprocessor 58 is positioned to selectively actuate the speaker 44 and a respective one of the plurality of light emitting diodes 62 to reward or encourage the user.

The housing 52 may comprise a panel 64, which is coupled by a perimeter 66 thereof to the cup 12. The perimeter 66 of the panel 64 may be substantially tear drop shaped, as shown in FIG. 2, or alternatively shaped, such as circular, square, and the like.

As shown in the embodiment depicted in FIG. 2, the plurality of light emitting diodes 62 is positioned in the interior space 60 and the panel 64 is translucent. The present invention also anticipates the light emitting diodes 62 being engaged to at least one the lid 14 and an exterior surface 68 of the housing 52.

The microprocessor 58 is positioned to selectively actuate a respective one of the plurality of light emitting diodes 62 to reward or encourage the user by lighting of the panel 64. The plurality of light emitting diodes 62 may comprise three light emitting diodes 62, each of which is configured to emit a respective one of blue light, yellow light, and red light. The blue light, the yellow light, and the red light that can be emitted selectively signal the user of a current consumption level relative to a target consumption level of the liquid, corresponding to "on track to achieve target consumption level", "tracking moderately short of target consumption level", and "tracking severely short of target consumption level", respectively. A broadcast from the speaker 44 may occur along with lighting of the panel, such as "Good Job", "Keep on drinking", "Drink up", and the like.

A sensor 70 is engaged to the pipe 28 and is configured to detect placement of the pipe 28 into the mouth of the user. The sensor 70 is operationally engaged to the first battery 48 and the transmitter 50. The sensor 70 is configured to sense positioning of the pipe 28 into the mouth of the user and to selectively signal the transmitter 50 of a sipping event. The transmitter 50 is positioned to communicate the sipping event to the microprocessor 58 via the receiver 54. The microprocessor 58 is positioned to selectively actuate the speaker 44 and a respective one of the plurality of light emitting diodes 62 to reward or encourage the user.

The sensor 70 may comprise a button 72, which is depressible. The button 72 is configured to be depressed upon contact with a lip or tongue of the user, positioning the sensor 70 to signal the transmitter 50 of the sipping event.

The device 10 also may comprises an electronic device 74, such as a smartphone 76, as shown in FIG. 1. The electronic device 74 comprises a transceiver 78 so that the electronic device 74 is positioned to receive the signal from the transmitter 50. Monitoring programming code 80, which is positioned on the electronic device 74, enables the electronic device 74 to display the target consumption level and the current consumption level. This permits a parent or other responsible party to monitor the consumption of liquid for a dependent, such as a child.

Target programming code 82, which is positioned on the electronic device 74, enables the parent or other responsible party to use the electronic device 74 to set the target consumption level.

In use, the cup 12 is filled with the liquid, in most cases water, and then is fitted with the lid 14. The cup 12 is supplied to the user for purposes of hydration. When the user drinks from the cup 12, they are rewarded or encouraged by the broadcast from the speaker 44 and a display of light from the respective light emitting diode 62. Depending on how the current consumption level is tracking the targeted consumption level, the color of light emitted by the light emitting diodes 62 and content of the broadcast from the speaker 44 will vary. The parent or other responsible party can monitor the current consumption level via the electronic device 74.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A liquid consumption monitoring device comprising:
a cup configured for positioning a liquid;
a lid selectively engageable to the cup for closing a top thereof, the lid having an opening positioned therein, wherein a rim of the lid proximate to the opening is configured for positioning on a lower lip of a user, positioning the user for tilting the cup for dispensing the liquid from the cup through the opening into a mouth of the user;
a flow meter engaged to the cup proximate to the opening, wherein the flow meter is configured for measuring a volume of the liquid passing through the opening; and
an interface engaged to at least one of the cup and the lid and being operationally engaged to the flow meter, such that the interface is positioned for receiving a signal from the flow meter when the liquid passes through the opening, the interface comprising at least one of a speaker and a bulb, wherein the interface is configured for selectively actuating the at least one of the speaker and the bulb, upon receipt of the signal from the flow meter, for providing a sensory reward to the user;
a pipe engaged to an upper face of the lid and extending from the opening, wherein the pipe is configured for positioning in the mouth of the user, positioning the user for tilting the cup for dispensing the liquid from the cup through the pipe into the mouth;
a first battery engaged to the lid, the first battery being operationally engaged to the flow meter;
a transmitter engaged to the lid, the transmitter being operationally engaged to the flow meter and the first battery;
the interface comprising:
a housing defining an interior space,
the bulb comprising a plurality of light emitting diodes engaged to the housing,
the speaker being engaged to the housing,
a receiver coupled to the housing and positioned in the interior space,
a second battery coupled to the housing and positioned in the interior space, and
a microprocessor coupled to the housing and positioned in the interior space, the microprocessor being operationally engaged to the plurality of light emitting diodes, the speaker, and the receiver, such that the transmitter is configured for communicating the signal from the flow meter to the microprocessor via the receiver, positioning the microprocessor for selectively actuating the speaker and a respective one of the plurality of light emitting diodes for rewarding the user; and
a sensor engaged to the pipe and being configured for detecting placement of the pipe into the mouth of the user, the sensor being operationally engaged to the first battery and the transmitter, wherein the sensor is configured for sensing positioning of the pipe into the mouth of the user and for selectively signaling the transmitter of a sipping event, configuring the transmitter for communicating the sipping event to the microprocessor via the receiver, configuring the microprocessor for selectively actuating the speaker and a respective one of the plurality of light emitting diodes for rewarding the user, wherein the sensor comprises a button, the button being depressible, wherein the button is configured for depressing upon contact with a lip or tongue of the user, configuring the sensor for signaling the transmitter of the sipping event.

2. The liquid consumption monitoring device of claim 1, wherein the lid is threadedly engageable to the cup.

3. The liquid consumption monitoring device of claim 1, further including a diaphragm engage to the pipe distal from the lid such that the diaphragm closes the pipe, the diaphragm being resiliently flexible, the diaphragm having a slit positioned therein, Wherein the slit is configured for separating upon application of suction to the pipe applied by the mouth of the user, such that the liquid passes from the cup through the pipe and the slit into the mouth of the user, wherein the diaphragm is configured for minimizing leakage of the liquid through the pipe should the cup be tipped without application of suction to the pipe.

4. The liquid consumption monitoring device of claim 3, wherein the diaphragm comprises at least one of rubber, silicone, and elastomer.

5. The liquid consumption monitoring device of claim 1, further including a straw engaged to a lower face of the lid and extending from the opening to proximate to a bottom of the cup, wherein the pipe is configured for positioning in the mouth of a user, enabling the user for suctioning the liquid from the cup through the straw and the pipe into the mouth of the user.

6. The liquid consumption monitoring device of claim 5, wherein the lower face of the lid has a recess extending into the lower face, the recess being complementary to the straw, such that the recess is positioned for selective insertion of the straw for frictionally engaging the straw to the lid.

7. The liquid consumption monitoring device of claim 1, wherein the housing is engaged to the cup.

8. The liquid consumption monitoring device of claim 7, wherein:
the housing comprises a panel coupled by a perimeter thereof to the cup, the panel being translucent; and
the plurality of light emitting diodes is positioned in the interior space, such that the microprocessor is configured for selectively actuating a respective one of the plurality of light emitting diodes for rewarding the user.

9. The liquid consumption monitoring device of claim 8, wherein the perimeter is substantially tear drop shaped.

10. The liquid consumption monitoring device of claim 1, wherein the plurality of light emitting diodes comprising three light emitting diodes, each light emitting diode being configured for emitting a respective one of blue light, yellow light, and red light, for selectively signaling the user of a current consumption level relative to a target consumption level of the liquid, corresponding to "on track to achieve target consumption level", "tracking moderately short of target consumption level", and "tracking severely short of target consumption level", respectively.

11. The liquid consumption monitoring device of claim 10, further including:
an electronic device comprising a transceiver such that the electronic device is configured for receiving the signal from the transmitter; and monitoring programming code positioned on the electronic device enabling the electronic device for displaying the target consumption level and the current consumption level.

12. The liquid consumption monitoring device of claim 10, further including:
an electronic device comprising a transceiver such that the electronic device is configured for signaling the microprocessor via the receiver; and
target programming code positioned on the electronic device enabling the electronic device for setting the target consumption level.

13. The liquid consumption monitoring device of claim 1, further including a ring engaged to the lid and extending therefrom, wherein the ring is configured for inserting a digit of a hand of the user for lifting and carrying the lid, the cup, and contents thereof.

14. The liquid consumption monitoring device of claim 1, wherein the cup is substantially hourglass shaped when viewed from a side thereof.

15. A liquid consumption monitoring device comprising:
a cup configured for positioning a liquid, the cup being substantially hourglass shaped when viewed from a side thereof;
a lid selectively engageable to the cup for closing a top thereof, the lid having an opening positioned therein, wherein a rim of the lid proximate to the opening is configured for positioning on a lower lip of a user, positioning the user for tilting the cup for dispensing the liquid from the cup through the opening into a mouth of the user, the lid being threadedly engageable to the cup;
a pipe engaged to an upper face of the lid and extending from the opening, wherein the pipe is configured for positioning in the mouth of the user, positioning the user for tilting the cup for dispensing the liquid from the cup through the pipe into the mouth;
a diaphragm engage to the pipe distal from the lid such that the diaphragm closes the pipe, the diaphragm being resiliently flexible, the diaphragm having a slit positioned therein, wherein the slit is configured for separating upon application of suction to the pipe applied by the mouth of the user, such that the liquid passes from the cup through the pipe and the slit into the mouth of the user, wherein the diaphragm is configured for minimizing leakage of the liquid through the pipe should the cup be tipped without application of suction to the pipe, the diaphragm comprising at least one of rubber, silicone, and elastomer;
a straw engaged to a lower face of the lid and extending from the opening to proximate to a bottom of the cup, wherein the pipe is configured for positioning in the mouth of a user, enabling the user for suctioning the liquid from the cup through the straw and the pipe into the mouth of the user, the lower face of the lid having a recess extending thereinto, the recess being complementary to the straw, such that the recess is positioned for selective insertion of the straw for frictionally engaging the straw to the lid;
a flow meter engaged to the cup proximate to the opening, wherein the flow meter is configured for measuring a volume of the liquid passing through the opening;
a first battery engaged to the lid, the first being operationally engaged to the flow meter;
a transmitter engaged to the lid, the transmitter being operationally engaged to the flow meter and the first battery;

a sensor engaged to the pipe and being configured for detecting placement of the pipe into the mouth of the user, the sensor being operationally engaged to the first battery and the transmitter, wherein the sensor is configured for sensing positioning of the pipe into the mouth of the user and for selectively signaling the transmitter of a sipping event, the sensor comprising a button, the button being depressible, wherein the button is configured for depressing upon contact with a lip or tongue of the user, configuring the sensor for signaling the transmitter of the sipping event;
an interface engaged to at least one of the cup and the lid and being operationally engaged to the flow meter, such that the interface is configured, for receiving a signal from the flow meter when the liquid passes through the opening, the interface comprising at least one of a speaker and a bulb, wherein the interface is configured for selectively actuating the at least one of the speaker and the bulb, upon receipt of the signal from the flow meter, for providing a sensory reward to the user, the interface comprising:
a housing defining an interior space, the bulb comprising a plurality of light emitting diodes engaged to the housing, the speaker being engaged to the housing, the housing being engaged to the cup, the housing comprising a panel coupled by a perimeter thereof to the cup, the panel being translucent, the plurality of light emitting diodes being configured, in the interior space, the perimeter being substantially tear drop shaped,
a receiver coupled to the housing and positioned in the interior space,
a second battery coupled to the housing and positioned in the interior space, and
a microprocessor coupled to the housing and positioned in the interior space, the microprocessor being operationally engaged to the plurality of light emitting diodes, the speaker, and the receiver, such that the transmitter is configured for communicating a least one of the signal from the flow meter and the sipping event to the microprocessor via the receiver, configuring the microprocessor for selectively actuating the speaker and a respective one of the plurality of light emitting diodes for rewarding the user;
the plurality of light emitting diodes comprising three light emitting diodes, each light emitting diode being configured for emitting a respective one of blue light, yellow light, and red light, for selectively signaling the user of a current consumption level relative to a target consumption level of the liquid, corresponding to "on track to achieve target consumption level", "tracking moderately short of target consumption level", and "tracking severely short of target consumption level", respectively;
an electronic device comprising a transceiver such that the electronic device is configured for receiving the signal from the transmitter;
monitoring programming code positioned on the electronic device enabling the electronic device for displaying the target consumption level and the current consumption level;
target programming code positioned on the electronic device enabling the electronic device for setting the target consumption level; and a ring engaged to the lid and extending therefrom, wherein the ring is configured for inserting a digit of a hand of the user for lifting and carrying the lid, the cup, and contents thereof.

* * * * *